United States Patent
Gerstner et al.

(10) Patent No.: US 10,319,122 B2
(45) Date of Patent: Jun. 11, 2019

(54) DISPLAY UNIT AND INSTALLATION FOR DISTRIBUTING ELECTRICAL ENERGY WITH A CORRESPONDING DISPLAY UNIT

(71) Applicant: Siemens Aktiengesellschaft, Munich (DE)

(72) Inventors: Michael Gerstner, Roettenbach (DE); Rainer Hauser, Nuremberg (DE); Bernd Schwinn, Fuerth (DE)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 0 days.

(21) Appl. No.: 14/612,334

(22) Filed: Feb. 3, 2015

(65) Prior Publication Data
US 2015/0235396 A1  Aug. 20, 2015

(30) Foreign Application Priority Data

Feb. 14, 2014 (DE) .................. 10 2014 202 723

(51) Int. Cl.
*G06T 11/20* (2006.01)
*G06F 1/26* (2006.01)
(Continued)

(52) U.S. Cl.
CPC ............ *G06T 11/206* (2013.01); *G06F 1/266* (2013.01); *G06F 1/3209* (2013.01);
(Continued)

(58) Field of Classification Search
CPC ... H04Q 9/14; H04B 17/318; H04W 52/0277; H03K 17/0826
See application file for complete search history.

(56) References Cited

U.S. PATENT DOCUMENTS 3,689,887 A * 9/1972 La Falce .................. H04Q 9/14
                                                       340/12.18
4,438,396 A * 3/1984 Harnden, Jr. ........ G01R 13/407
                                                       324/115
(Continued)

FOREIGN PATENT DOCUMENTS

CN         102568959 A      7/2012
CN         202423836 U      9/2012
(Continued)

OTHER PUBLICATIONS

Blink element, Wikipedia, year 1990.*
(Continued)

*Primary Examiner* — Devona E Faulk
*Assistant Examiner* — Ming Wu
(74) *Attorney, Agent, or Firm* — Harness, Dickey & Pierce, P.L.C.

(57) ABSTRACT

A display unit and an installation are disclosed for distributing electrical energy. In an embodiment, a display unit includes a plurality of switches. The display unit is connected via a communication link to the switches and is configured to receive data relating to the operation of the switches. Each switch of the installation comprises two mechanically disconnectable switching elements, a sensor unit to detect the current flowing over the switching elements, an electronic trip unit to initiate the disconnection of the switching elements if a trip condition allocated to the switch is fulfilled, and a mechanical switching unit to disconnect the switching elements if the trip condition is fulfilled.

15 Claims, 1 Drawing Sheet

(51) Int. Cl.
  *G06F 1/32* (2019.01)
  *G06F 13/40* (2006.01)
  *G06F 1/3209* (2019.01)
  *G06F 1/3246* (2019.01)
  *H02J 3/00* (2006.01)

(52) U.S. Cl.
  CPC ........ *G06F 1/3246* (2013.01); *G06F 13/4022* (2013.01); *G06T 11/203* (2013.01); *H02J 3/00* (2013.01); *G06F 2200/261* (2013.01)

(56) References Cited

U.S. PATENT DOCUMENTS

| | | | | |
|---|---|---|---|---|
| 4,736,367 A | * | 4/1988 | Wroblewski | H04Q 9/14 307/10.1 |
| 4,771,357 A | * | 9/1988 | Lorincz | H03K 17/0826 323/278 |
| 5,038,401 A | * | 8/1991 | Inotsume | H03J 1/0025 341/23 |
| 5,596,473 A | | 1/1997 | Johnson et al. | |
| 5,872,722 A | * | 2/1999 | Oravetz | H02H 3/006 345/440 |
| 6,219,046 B1 | * | 4/2001 | Thomas | G05B 23/0216 700/286 |
| 8,265,776 B2 | * | 9/2012 | Osann, Jr. | G06Q 50/06 340/637 |
| 9,088,160 B2 | * | 7/2015 | Yang | H02H 7/28 |
| 2005/0024292 A1 | * | 2/2005 | Cato | G06F 3/147 345/1.1 |
| 2009/0278997 A1 | * | 11/2009 | Sano | G06F 3/147 348/739 |
| 2010/0087144 A1 | * | 4/2010 | Korenshtein | H04B 17/318 455/41.2 |
| 2012/0230846 A1 | * | 9/2012 | Stephens | A62C 3/00 417/279 |
| 2014/0031090 A1 | * | 1/2014 | Hart | H04W 52/0277 455/572 |

FOREIGN PATENT DOCUMENTS

| | | |
|---|---|---|
| CN | 103928861 A | 7/2014 |
| DE | 69620667 T2 | 12/2002 |

OTHER PUBLICATIONS

Blink element, Wikipedia, year 1990. (Year: 1990).*
Office Action for German Patent Application No. 10 2014 202 723.3 dated Feb. 28, 2017.
Office Action for Chinese Patent Application No. 201510077434.6 dated Nov. 1, 2017.

* cited by examiner

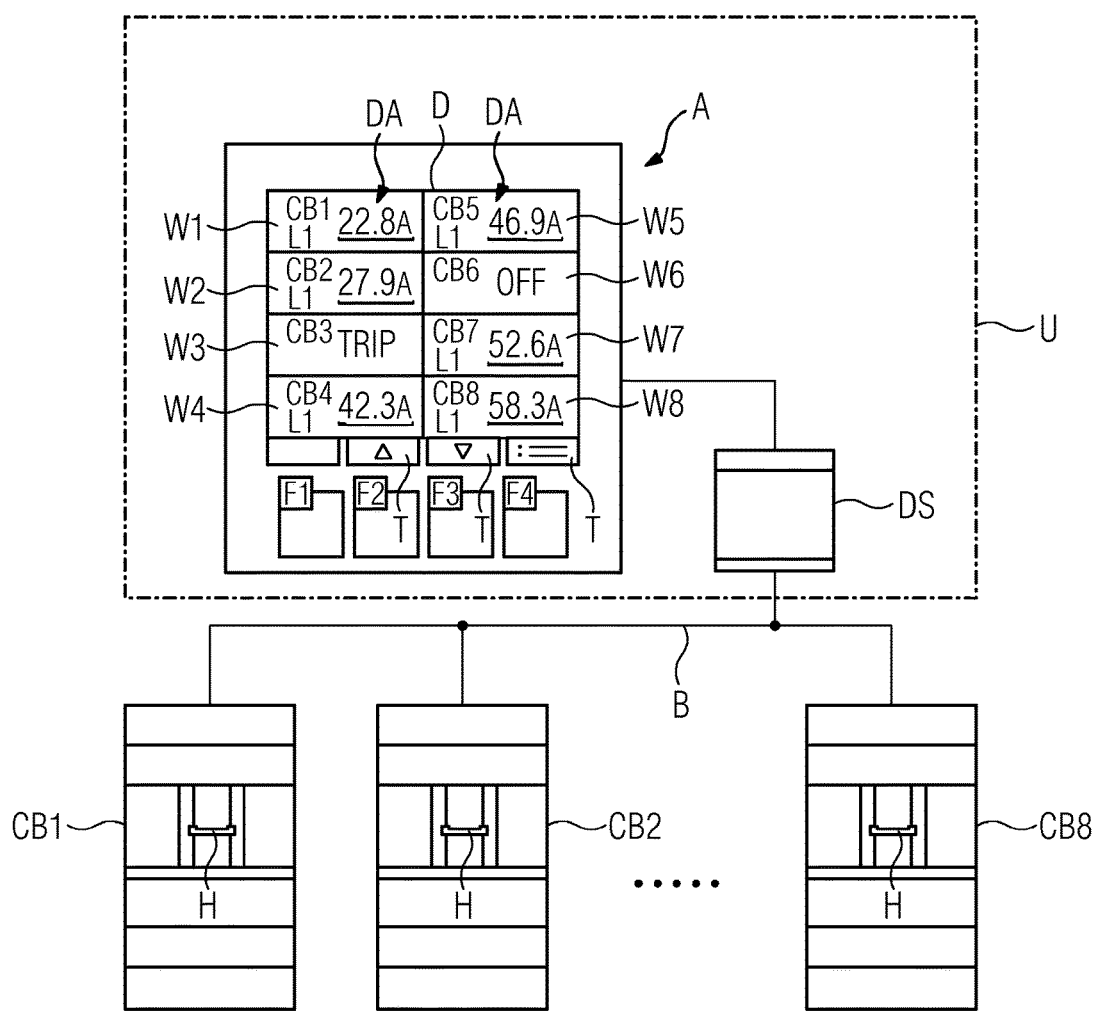

DISPLAY UNIT AND INSTALLATION FOR DISTRIBUTING ELECTRICAL ENERGY WITH A CORRESPONDING DISPLAY UNIT

PRIORITY STATEMENT

The present application hereby claims priority under 35 U.S.C. § 119 to German patent application number DE 102014202723.3 filed Feb. 14, 2014, the entire contents of which are hereby incorporated herein by reference.

FIELD

At least one embodiment of the invention generally relates to a display unit and an installation for distributing electrical energy which has a corresponding display unit.

BACKGROUND

Installations for distributing electrical energy among a plurality of installation branches to which consumers are connected are known. The distribution is effected by way of switches designed as protective switches. Each switch has at least one switching contact which is formed from two mechanical switching elements which are adjacent to one another when the switching contact is closed. The basis for the protective function is the current flowing over the switching elements, which is detected by means of a sensor unit.

An electronic trip unit evaluates the detected current and effects a disconnection of the switching elements if a current-dependent trip condition allocated to the switch is fulfilled. In the simplest case, the trip condition consists in the exceeding of a current threshold. A mechanical switching element, e.g. in the form of a switching shaft, disconnects the switching elements if the trip condition is satisfied and the trip unit has generated a corresponding trip signal.

The disadvantage here is that the switches in the switching installation are usually installed in switch cabinets, wherein their display elements are not visible as displays when the cabinet door is closed. It is not therefore possible to read out the parameters of the switches without additional effort. The same applies to the parameters measured by the switches, such as the load currents and voltages of the individual phases, and also the performance data.

One solution for overcoming these disadvantages consists in providing corresponding recesses or openings in the switch cabinet door and in arranging the switch or switches in such a way that the display elements are visible from outside.

A different solution uses a remote external display for each switch, said display being connected via a communication link to the associated switch only. These displays are fitted outside the switch cabinet, e.g. on the switch cabinet door. In this solution, a dedicated display is managed for each switch.

SUMMARY

At least one embodiment of the invention overcomes at least one of the aforementioned disadvantages.

At least one embodiment of the invention is directed to a display unit and/or a switching installation.

In respect of an embodiment of the display unit, the display unit is connected via a communication link to the switches and receives data relating to the operation of the switches, wherein the data are displayed by the display unit. Data relating to the switches and their switching state (on, off, trip), their present load current but also their protective parameters, measured values, alarm and error messages can thus be displayed so that they are evident at a glance. An immediate overview of the switching state of the individual switches and therefore simultaneously the entire switching installation is therefore obtained.

In respect of an embodiment of the switching installation for distributing electrical energy among a plurality of installation branches via switches, a data server is connected via a communication link to the switches and receives data relating to the operation of the switches, and that a display unit is furthermore connected via a communication link to the data server and displays the data of the switches, wherein each switch comprises: a) at least two mechanically disconnectable switching elements, b) a sensor unit which detects the current flowing over the switching elements, c) an electronic trip unit which initiates the disconnection of the switching elements if a trip condition allocated to the switch is fulfilled, and d) a mechanical switching unit which disconnects the switching elements if the trip condition is fulfilled. The wiring requirement is relatively small, since only one display unit (an additional display or display module) needs to be connected, which furthermore requires only a small amount of space. Furthermore, the switch data can be more easily compared, since all data are displayed on a single display unit, as a result of which, e.g., the currents and voltages of a plurality of installation branches can simply be compared with one another.

BRIEF DESCRIPTION OF THE DRAWINGS

The single FIGURE of the drawing shows, in a schematic presentation, protective switches CB1, CB2, . . . , CB8, a data server DS and a display unit A designed as a module (not shown), wherein the display unit A has a display D and is designed here as a display module. In the example embodiment, by way of example, eight switches CB1, CB2, . . . , CB8 are connected via the data server DS to a display unit A via a bus connection B (a corresponding data bus).

DETAILED DESCRIPTION OF THE EXAMPLE EMBODIMENTS

Various example embodiments will now be described more fully with reference to the accompanying drawings in which only some example embodiments are shown. Specific structural and functional details disclosed herein are merely representative for purposes of describing example embodiments. The present invention, however, may be embodied in many alternate forms and should not be construed as limited to only the example embodiments set forth herein.

Accordingly, while example embodiments of the invention are capable of various modifications and alternative forms, embodiments thereof are shown by way of example in the drawings and will herein be described in detail. It should be understood, however, that there is no intent to limit example embodiments of the present invention to the particular forms disclosed. On the contrary, example embodiments are to cover all modifications, equivalents, and alternatives falling within the scope of the invention. Like numbers refer to like elements throughout the description of the figures.

Before discussing example embodiments in more detail, it is noted that some example embodiments are described as processes or methods depicted as flowcharts. Although the flowcharts describe the operations as sequential processes, many of the operations may be performed in parallel, concurrently or simultaneously. In addition, the order of operations may be re-arranged. The processes may be terminated when their operations are completed, but may also have additional steps not included in the FIGURE. The processes may correspond to methods, functions, procedures, subroutines, subprograms, etc.

Methods discussed below, some of which are illustrated by the flow charts, may be implemented by hardware, software, firmware, middleware, microcode, hardware description languages, or any combination thereof. When implemented in software, firmware, middleware or microcode, the program code or code segments to perform the necessary tasks will be stored in a machine or computer readable medium such as a storage medium or non-transitory computer readable medium. A processor(s) will perform the necessary tasks.

Specific structural and functional details disclosed herein are merely representative for purposes of describing example embodiments of the present invention. This invention may, however, be embodied in many alternate forms and should not be construed as limited to only the embodiments set forth herein.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of example embodiments of the present invention. As used herein, the term "and/or," includes any and all combinations of one or more of the associated listed items.

It will be understood that when an element is referred to as being "connected," or "coupled," to another element, it can be directly connected or coupled to the other element or intervening elements may be present. In contrast, when an element is referred to as being "directly connected," or "directly coupled," to another element, there are no intervening elements present. Other words used to describe the relationship between elements should be interpreted in a like fashion (e.g., "between," versus "directly between," "adjacent," versus "directly adjacent," etc.).

The terminology used herein is for the purpose of describing particular embodiments only and is not intended to be limiting of example embodiments of the invention. As used herein, the singular forms "a," "an," and "the," are intended to include the plural forms as well, unless the context clearly indicates otherwise. As used herein, the terms "and/or" and "at least one of" include any and all combinations of one or more of the associated listed items. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Unless otherwise defined, all terms (including technical and scientific terms) used herein have the same meaning as commonly understood by one of ordinary skill in the art to which example embodiments belong. It will be further understood that terms, e.g., those defined in commonly used dictionaries, should be interpreted as having a meaning that is consistent with their meaning in the context of the relevant art and will not be interpreted in an idealized or overly formal sense unless expressly so defined herein.

Portions of the example embodiments and corresponding detailed description may be presented in terms of software, or algorithms and symbolic representations of operation on data bits within a computer memory. These descriptions and representations are the ones by which those of ordinary skill in the art effectively convey the substance of their work to others of ordinary skill in the art. An algorithm, as the term is used here, and as it is used generally, is conceived to be a self-consistent sequence of steps leading to a desired result. The steps are those requiring physical manipulations of physical quantities. Usually, though not necessarily, these quantities take the form of optical, electrical, or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

In the following description, illustrative embodiments may be described with reference to acts and symbolic representations of operations (e.g., in the form of flowcharts) that may be implemented as program modules or functional processes include routines, programs, objects, components, data structures, etc., that perform particular tasks or implement particular abstract data types and may be implemented using existing hardware at existing network elements. Such existing hardware may include one or more Central Processing Units (CPUs), digital signal processors (DSPs), application-specific-integrated-circuits, field programmable gate arrays (FPGAs) computers or the like.

Note also that the software implemented aspects of the example embodiments may be typically encoded on some form of program storage medium or implemented over some type of transmission medium. The program storage medium (e.g., non-transitory storage medium) may be magnetic (e.g., a floppy disk or a hard drive) or optical (e.g., a compact disk read only memory, or "CD ROM"), and may be read only or random access. Similarly, the transmission medium may be twisted wire pairs, coaxial cable, optical fiber, or some other suitable transmission medium known to the art. The example embodiments not limited by these aspects of any given implementation.

It should be borne in mind, however, that all of these and similar terms are to be associated with the appropriate physical quantities and are merely convenient labels applied to these quantities. Unless specifically stated otherwise, or as is apparent from the discussion, terms such as "processing" or "computing" or "calculating" or "determining" of "displaying" or the like, refer to the action and processes of a computer system, or similar electronic computing device/hardware, that manipulates and transforms data represented as physical, electronic quantities within the computer system's registers and memories into other data similarly represented as physical quantities within the computer system memories or registers or other such information storage, transmission or display devices.

Spatially relative terms, such as "beneath", "below", "lower", "above", "upper", and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, term such as "below" can encompass both an orientation of above and below. The device may be otherwise oriented (rotated 90 degrees or at other orientations) and the spatially relative descriptors used herein are interpreted accordingly.

Although the terms first, second, etc. may be used herein to describe various elements, components, regions, layers and/or sections, it should be understood that these elements, components, regions, layers and/or sections should not be limited by these terms. These terms are used only to distinguish one element, component, region, layer, or section from another region, layer, or section. Thus, a first element, component, region, layer, or section discussed below could be termed a second element, component, region, layer, or section without departing from the teachings of the present invention.

In respect of an embodiment of the display unit, the display unit is connected via a communication link to the switches and receives data relating to the operation of the switches, wherein the data are displayed by the display unit. Data relating to the switches and their switching state (on, off, trip), their present load current but also their protective parameters, measured values, alarm and error messages can thus be displayed so that they are evident at a glance. An immediate overview of the switching state of the individual switches and therefore simultaneously the entire switching installation is therefore obtained.

The data of all switches are in each case appropriately displayed here.

It is technically simple if a display is provided for this purpose.

For simplification, it is proposed that the communication connections are designed as bus connections.

It is technically simpler if the display element is connected to the switches via a communication link via a data server and the data server transmits and receives the data.

A simple exchange is possible if the display unit, together with the data server, forms a display/data unit.

The setup is simplified if the display is adapted automatically to the number of switches used.

The efficiency of the display is increased if the data are displayed in prioritized form.

In order to implement a protective function, it is proposed that each step comprises: at least two mechanically disconnectable switching elements, a sensor unit which detects the current flowing over the switching elements, an electronic trip unit which initiates the disconnection of the switching elements if a trip condition allocated to the switch is fulfilled, and a mechanical switching unit which disconnects the switching elements if the trip condition is fulfilled.

In respect of an embodiment of the switching installation for distributing electrical energy among a plurality of installation branches via switches, a data server is connected via a communication link to the switches and receives data relating to the operation of the switches, and that a display unit is furthermore connected via a communication link to the data server and displays the data of the switches, wherein each switch comprises: a) at least two mechanically disconnectable switching elements, b) a sensor unit which detects the current flowing over the switching elements, c) an electronic trip unit which initiates the disconnection of the switching elements if a trip condition allocated to the switch is fulfilled, and d) a mechanical switching unit which disconnects the switching elements if the trip condition is fulfilled. The wiring requirement is relatively small, since only one display unit (an additional display or display module) needs to be connected, which furthermore requires only a small amount of space. Furthermore, the switch data can be more easily compared, since all data are displayed on a single display unit, as a result of which, e.g., the currents and voltages of a plurality of installation branches can simply be compared with one another.

A dynamic management of a plurality of switches with this display unit is preferably provided, i.e. the internal data structure is in each case adapted to the number of switches and the data of the switches are then in each case clearly displayed (made available).

The data of the switches on this display are advantageously prioritized. Thus, for example, the "TRIP" switching state can be highlighted as flashing text in order to indicate problems in the switching installation simply, quickly and warningly. Furthermore, the phase of the switches with the highest phase current can in each case be highlighted.

An embodiment of the invention is described in detail below with reference to a drawing.

The switching installation serves to distribute electrical energy among a plurality of installation branches (not shown) via the switches CB1, CB2, . . . , CB8, which are designed here as power switches.

Each switch CB1, CB2, . . . , CB8 comprises two mechanically disconnectable switching elements, a sensor unit which detects the current flowing over the switching elements, an electronic trip unit which initiates the disconnection of the switching elements if a trip condition allocated to the switch CB1, CB2, . . . , CB8 is fulfilled, and a mechanical switching unit which disconnects the switching elements if the trip condition is fulfilled (not shown). The switching on and off of the switches CB1, CB2, . . . , CB8 can be performed manually via a handle H.

The data server DS receives on request in each case selected data DA from the switches CB1, CB2, . . . , CB8 relating to their operation, and supplies the display unit A via the bus connection B with the data DA. To display the data DA, the display D of the display unit A is divided up according to the number of switches CB1, CB2, . . . , CB8 into eight windows W1, W2, . . . , W8.

In the windows W1, W2, . . . , W8, the switch CB1, CB2, . . . , CB8 appears in each case at the top left, the data DA relating to which are displayed in this window W1, W2, . . . , W8. The display unit A displays the data DA of all switches CB1, CB2, . . . , CB8 in prioritized form. In respect of the currents of the three phases L1, L2, L3, this therefore means the current of the phase L1, L2, L3, which is in each case the highest. Thus, the current of the phase L1 is displayed in each case for the switches CB1 and CB2, CB4 and CB5 and also CB7 and CB8, since, in all switches CB1, CB2, CB4, CB5, CB7, CB8, the current of the phase L1 is in each case the highest and the current of the two other associated phases L2, L3 is lower. The digital current value in amperes appears in each case next to it.

Furthermore, the display unit A indicates that the switch CB3 has tripped (TRIP display in the associated window W3) and that the switch CB6 is switched off (OFF display in the associated window W6). The TRIP display has the highest display priority; when the switch CB6 is switched off, the OFF display is the only information which is available here for the display (and is therefore displayed).

The data DA of all switches CB1, CB2, . . . , CB8 and their switching state (ON, OFF, TRIP), the phases L1, L2, L3 and their present load current in amperes, but also protection parameters (threshold values), measured values (currents), alarm and error messages (flashing TRIP display) can therefore be displayed here with the display unit A, so that they are evident at a glance. An immediate overview of the respective switching state of the individual switches CB1, CB2, . . . , CB8 and therefore the entire switching installation is therefore in each case obtained. For this reason, the data DA of all switches CB1, CB2, . . . , CB8 are in each case simultaneously displayed.

The keys F1, F2, F3, F4, from which menus and submenus can be selected with the right-hand button F4, serve as navigation elements, while the selection is made by means of the two direction keys F2, F3 to the left thereof. The windows T disposed above with the small triangles pointing upward or downward and the schematically presented menu display the required selection direction or selection.

In the example embodiment, the display unit A and the data server DS together form a display/data unit U, i.e. the display unit A and the data server DS are "merged" with one another to form a display/data unit.

The switches CB1, CB2, . . . , CB8 of the display unit U are dynamically managed, i.e. the internal data structure and the display of the display unit A (on the display D) is in each case automatically adapted to the respective number of switches CB1, CB2, . . . , CB8.

The patent claims filed with the application are formulation proposals without prejudice for obtaining more extensive patent protection. The applicant reserves the right to claim even further combinations of features previously disclosed only in the description and/or drawings.

The example embodiment or each example embodiment should not be understood as a restriction of the invention. Rather, numerous variations and modifications are possible in the context of the present disclosure, in particular those variants and combinations which can be inferred by the person skilled in the art with regard to achieving the object for example by combination or modification of individual features or elements or method steps that are described in connection with the general or specific part of the description and are contained in the claims and/or the drawings, and, by way of combinable features, lead to a new subject matter or to new method steps or sequences of method steps, including insofar as they concern production, testing and operating methods.

References back that are used in dependent claims indicate the further embodiment of the subject matter of the main claim by way of the features of the respective dependent claim; they should not be understood as dispensing with obtaining independent protection of the subject matter for the combinations of features in the referred-back dependent claims. Furthermore, with regard to interpreting the claims, where a feature is concretized in more specific detail in a subordinate claim, it should be assumed that such a restriction is not present in the respective preceding claims.

Since the subject matter of the dependent claims in relation to the prior art on the priority date may form separate and independent inventions, the applicant reserves the right to make them the subject matter of independent claims or divisional declarations. They may furthermore also contain independent inventions which have a configuration that is independent of the subject matters of the preceding dependent claims.

Further, elements and/or features of different example embodiments may be combined with each other and/or substituted for each other within the scope of this disclosure and appended claims.

Still further, any one of the above-described and other example features of the present invention may be embodied in the form of an apparatus, method, system, computer program, tangible computer readable medium and tangible computer program product. For example, of the aforementioned methods may be embodied in the form of a system or device, including, but not limited to, any of the structure for performing the methodology illustrated in the drawings.

Even further, any of the aforementioned methods may be embodied in the form of a program. The program may be stored on a tangible computer readable medium and is adapted to perform any one of the aforementioned methods when run on a computer device (a device including a processor). Thus, the tangible storage medium or tangible computer readable medium, is adapted to store information and is adapted to interact with a data processing facility or computer device to execute the program of any of the above mentioned embodiments and/or to perform the method of any of the above mentioned embodiments.

The tangible computer readable medium or tangible storage medium may be a built-in medium installed inside a computer device main body or a removable tangible medium arranged so that it can be separated from the computer device main body. Examples of the built-in tangible medium include, but are not limited to, rewriteable non-volatile memories, such as ROMs and flash memories, and hard disks. Examples of the removable tangible medium include, but are not limited to, optical storage media such as CD-ROMs and DVDs; magneto-optical storage media, such as MOs; magnetism storage media, including but not limited to floppy disks (trademark), cassette tapes, and removable hard disks; media with a built-in rewriteable non-volatile memory, including but not limited to memory cards; and media with a built-in ROM, including but not limited to ROM cassettes; etc. Furthermore, various information regarding stored images, for example, property information, may be stored in any other form, or it may be provided in other ways.

Example embodiments being thus described, it will be obvious that the same may be varied in many ways. Such variations are not to be regarded as a departure from the spirit and scope of the present invention, and all such modifications as would be obvious to one skilled in the art are intended to be included within the scope of the following claims.

What is claimed is:

1. A display system of a switching installation for distributing electrical energy among a plurality of installation branches via a plurality of protective switches, the display system comprising:
a data server;
a plurality of protective switches connected to the data server via a communication link; and
a display connected to the plurality of protective switches via the communication link, the display being configured to receive and display data relating to operation of the protective switches from the data server,
wherein each protective switch comprises three phases,
wherein data received from the data server of all of the protective switches is displayed simultaneously on the display and the display is adapted automatically to the respective number of protective switches installed in the switching installation,
wherein display data includes switch identity, switch state, present load current, measured values and alarm/error messages,
wherein the display provides simultaneously information relating to each protective switch including the states on, off and trip,
wherein for each protective switch the display displays the protective switch identity together with the state of the protective switch, and, when an protective switch that comprises three phases is switched on, current of one single phase out of three phases is displayed by displaying the current value of the phase with the highest current of the three phases, when an protective switch is switched off, OFF is displayed, and when an protective switch is tripped, TRIP is displayed as highlighted flashing text.

2. The display system of claim 1, wherein the plurality of protective switches is interconnected via communication connections that are designed as bus connections.

3. The display system of claim 1, wherein the display system is connected via the communication link via the data server to the protective switches and the data server is configured to transmit and receive the data.

4. The display system of claim 3, wherein the display system, together with the data server, form a display/data server combination.

5. The display system of claim 1, wherein the data are displayed in prioritized form.

6. A switching installation for distributing electrical energy among a plurality of installation branches via a plurality of protective switches, each protective switch comprising three phases, the switching installation comprising:

a data server, connected via a communication link to the plurality of protective switches, to receive data relating to operation of the protective switches; and a display connected via a communication link to the data server, to display the data of the protective switches, wherein the display is configured to display the data, wherein data of all protective switches is displayed simultaneously on the display and the display is adapted automatically to the respective number of protective switches installed in the switching installation, and wherein each protective switch comprises:

at least two mechanically disconnectable switching elements, a sensor to detect a current flowing over the at least two mechanically disconnectable switching elements, an electronic tripping device to initiate disconnection of the at least two mechanically disconnectable switching elements if a trip condition allocated to the switch is fulfilled, and a mechanical switch to disconnect the at least two mechanically disconnectable switching elements if the trip condition is fulfilled, wherein the received data includes switch identity, switch state, present load current, measured values and alarm/error messages, wherein the display provides simultaneously information relating to each protective switch including the states on, off and trip, wherein for each protective switch the display is displaying the protective switch identity together with the state of the protective switch, and, when an protective switch that comprises three phases is switched on, current of one single phase out of three phases is displayed by displaying the current value of the phase with the highest current of the three phases, when an protective switch is switched off, OFF is displayed, and when an protective switch is tripped, TRIP is displayed as highlighted flashing text.

7. The display system of claim 1, wherein the display is divided into viewable windows according to the number of protective switches installed in the switching installation.

8. The switching installation of claim 6, wherein the display is divided into viewable windows according to the number of protective switches installed in the switching installation.

9. An protective switch having three phases, comprising at least two mechanically disconnectable switching elements, a sensor to detect a current flowing over the switching elements, an electronic tripping device to initiate the disconnection of the switching elements if a trip condition allocated to the switch is fulfilled, and a mechanical switch to disconnect the switching elements if the trip condition is fulfilled, the protective switch being connected via a communication link to a display unit of a switching installation, wherein the display unit is configured to receive and display data relating to operation of the protective switch, wherein the display unit comprises a display to display data, wherein data of all installed power switches is displayed simultaneously on the display and the display is adapted automatically to the respective number of switches installed in the switching installation, wherein display data includes switch identity, switch state, present load current, measured values and alarm/error messages, wherein the display provides simultaneously information relating to each protective switch including the states on, off and trip, wherein for each protective switch the display is displaying the protective switch identity together with the state of the protective switch, and, when an protective switch that comprises three phases is switched on, current of one single phase out of three phases is displayed by displaying the current value of the phase with the highest current of the three phases, when an protective switch is switched off, OFF is displayed, and when an protective switch is tripped, TRIP is displayed as highlighted flashing text.

10. The protective switch of claim 9 comprising three phases and the phase of the power switch with the highest phase current is displayed in a highlighted manner.

11. The power switch of claim 9, wherein the display is divided up into viewable windows according to the number of switches installed in the switching installation.

12. The display system of claim 1, wherein the display has a plurality of manually operable keys configured as a user input.

13. The display system of claim 1, wherein an internal data structure is in each case adapted to the number of switches and the data of the protective switches are then in each case clearly displayed.

14. The switching installation of claim 6, wherein an internal data structure is in each case adapted to the number of switches and the data of the protective switches are then in each case clearly displayed.

15. The overload protective switch of claim 9, wherein an internal data structure is in each case adapted to the number of switches and the data of the protective switches are then in each case clearly displayed.

* * * * *